Sept. 7, 1954
J. BLAKE
2,688,651
CABLE JOINT PROTECTOR
Filed April 10, 1951
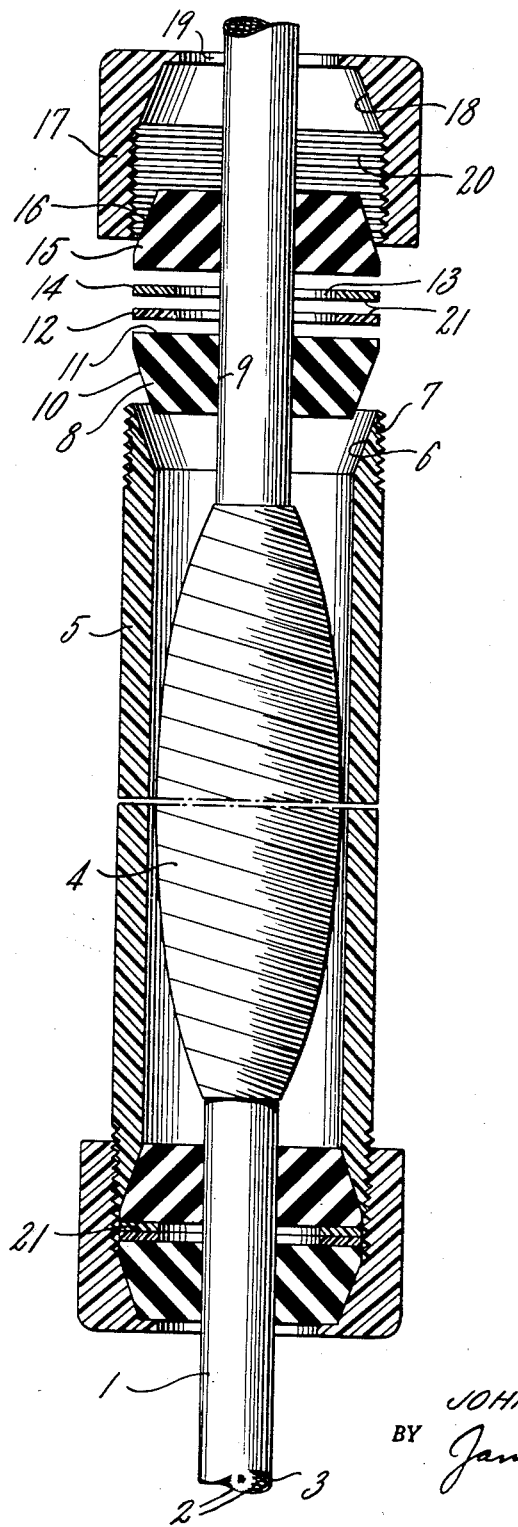
INVENTOR.
JOHN BLAKE
BY James J. Long
AGENT Patented Sept. 7, 1954

2,688,651

UNITED STATES PATENT OFFICE 2,688,651

CABLE JOINT PROTECTOR

John Blake, Hawthorne, N. Y., assignor to United States Rubber Company, New York, N. Y., a corporation of New Jersey Application April 10, 1951, Serial No. 220,320

1 Claim. (Cl. 174—93)

This invention relates to an improved protector for cable joints and more particularly it relates to an enclosing assembly for sealing or protecting a joint or splice in an electrical cable.

A principal object of the present invention is to provide a protector for cable splices that is effectively moisture-proof over prolonged periods of time.

Another object of the invention is the provision of a protective enclosure for an electrical cable splice that is easily assembled over the cable splice in the field and at the same time provides for complete sealing of the splice.

Still another object is to provide an electrical cable joint protector in which an adequate and long lasting seal is effected, such seal not being dependent upon any applied cements, or similar sealing compositions.

Still a further object is to provide an enclosing assembly of the character indicated that is constructed of long lasting acid, oil, alkali and moisture-resistant electrically insulating material, that is mechanically strong and particularly resistant to impact.

A further object of the invention is the provision of a cable joint protector embodying an improved seal that provides for development of relatively great sealing pressures.

The foregoing objects, and additional objects and advantages, will be made apparent in the following detailed description, when considered in conjunction with the accompanying drawing, wherein there is shown a section of a cable joint protector constructed according to the present invention, with the parts of one end of the assembly shown in exploded relation.

Referring to the drawing, the electrical cable 1 shown therein is comprised of a plurality of insulated electrical conductors 2 covered by an outer protective jacket 3. The cable 1 has therein a splice or joint made in the usual manner and covered with suitable insulating tape 4. The cable jacket 3 may be of rubber or similar insulation, or the cable may be of the lead-sheathed type.

The main body of the joint protector comprises a tube or sleeve 5 made of a plastic composition comprising a mixture of rubbery butadiene-acrylonitrile polymer (Buna-N) and hard, resinous, relatively inelastic copolymer of a major proportion of styrene and a minor proportion of butadiene. A typical composition may comprise a uniform mixture of 30 parts by weight of Buna-N (copolymer of, e. g., 35 parts acrylonitrile and 65 parts butadiene) and 70 parts of a resinous copolymer of 75 parts styrene and 25 parts acrylonitrile. Compositions of this character are disclosed in U. S. Patent 2,439,202, to L. E. Daly.

The ends of the enclosing tube 5 are provided with an internal tapered section 6, and an external threaded tapered section 7. A relatively large inner or first plug or gasket 8 of resilient material, such as rubber, having a central hole 9 for accommodating the cable 1, engages the cable snugly at each end of the tube assembly. Each inner plug 8 has a tapered portion 10 of gradually decreasing diameter in the direction of the splice, and such tapered portion is adapted to cooperate with the internal smooth taper 6 on the ends of the tube 5 so that when the plug is urged axially into the tube 5, radial compression is imposed on the plug, causing it to bear in tight sealing engagement with the cable 1, as well as with the tapered wall 6 of the tube 5.

The outer end of the plug 8 is provided with a flat end surface 11, and a relatively thin flat ring or washer 12 having a central opening 13 for the cable is disposed over such end surface. A similar relatively thin outer washer 14 is superimposed on the first washer 12, and a relatively large outer resilient plug 15 having a flat end surface 16 that bears against the outer surface of the outer washer 14. The washers 12 and 14 are made of a hard, relatively frictionless material, and are preferably made of the same synthetic rubber-resin blend as the body or casing 5 of the protector. The outer resilient plug 15 is similar to the inner plug 8, but is oppositely disposed in assembly, and has its tapered portion 16 pointing away from the splice and toward a cap member 17. The cap 17 is made of the same plastic material as the casing 5, and has toward its end an internal tapered section 18 adapted to cooperate with the tapered end 16 of the plug 15. A central opening 19 in the outer face of the end cap 17 provides for passage of the cable 1 into the assembly. The cap 17 also has an internal threaded section 20 adapted to engage the cooperating external thread 7 on the end of the casing 5 and to draw the parts of the assembly together tightly when the cap is threaded onto the end of the casing, as indicated at the lower portion of the drawing.

In field installation, the cap 17, the plug 15, the washers 14 and 12, the plug 8 and the tube 5 are slipped over one of the cables to be joined and the remaining cap, plugs and washers are slipped over the other cable and in appropriate order. After splicing the cables, the tube 5 is slipped over the splice, and the assembly is then screwed tightly together as shown in the lower end of the figure. The end cap 17 exerts a squeezing action on the outer and inner resilient plugs 15 and 8. As the tapered portion 16 of the outer plug 15 is forced against the correspondingly tapered portion 18 of the interior of the cap a fluid tight seal is produced between the plug 15 and the cap and at the same time the wall of the central opening in the plug is forced against the wall of the cable. A similar water tight seal is formed as the tapered portion 10 of the inner plug 8 is forced by the inward movement of the cap 17 against the corresponding internal taper 6 in the end of the sleeve 5. The washers 12 and 14 interposed between the resilient plugs 8 and 15 permit the end cap 17 to be screwed onto the threaded end of the sleeve 5 with sufficient tightness to force the resilient plugs into tight sealing engagement with the cap and sleeve. The washers 12 and 14 accomplish this purpose because they are made of material having relatively low surface friction compared to the surface friction of the resilient plugs. Therefore, as the end cap is squeezed down on the resilient plugs, and the washers 12 and 14 are pressed together, there occurs a relative rotation of the opposed contacting surfaces 21 of the washers with respect to each other. This relative rotation of the washers as the end cap is screwed on tighter makes it possible to continue to turn the end cap inwardly even after the pressure of the resilient plugs against the tapered portions 18 and 6 of the cap and sleeve becomes very great. Ordinarily, in the absence of the washers 12 and 14 of relatively low friction resistance, the frictional resistance of the resilient plugs against the cap and sleeve would be so great as to resist further tightening of the end cap after a certain relatively low contacting pressure was exceeded. The washers 12 and 14 therefore insure that the end cap can be easily tightened in the field to produce a fluid tight seal between the resilient plugs and the protective cable housing. There is thus formed a highly effective positive seal which prevents the penetration of even the smallest amounts of moisture into the interior of the sleeve 5, wherein such moisture would tend to condense and accumulate to the detriment of the cable splice.

The cable joint protector will also relieve the cable splice from mechanical strains such as might otherwise result from stresses incident to movement or handling of the cable etc. In this way a permanent trouble free splice structure that is effective mechanically as strong as the unspliced length of the cable is obtained.

Because the external parts of the joint enclosure are made of tough, hard, relatively shatter-proof plastic composition of the character disclosed, the enclosure affords unusually effective protection as compared to Bakelite, hard rubber, or the like. Blows that would shatter such Bakelite or ordinary hard rubber compositions have no effect on the present joint protector.

The plastic material employed is resistant to moisture and corrosive influences. The material does not tend to become distorted or to crack upon aging. The splice is so effectively sealed off from the effects of moisture that it is unnecessary to apply a lead coating to the splice, as has formerly been the common practice with lead-sheathed cables. The operation of making the splice is greatly simplified, and in the event that it ever becomes necessary to break the splice at some future time, it is very easily taken apart.

Another advantage of the present construction is that the tapered plastic threads are capable of being screwed into perfectly tight engagement without employing the usual thread sealing compounds.

It has been found by actual test that the sealing action provided by the described arrangement of resilient plugs and interposed anti-friction washers is superior to that obtainable with previously known constructions used for this purpose. The sealing action of the splice protector was tested by producing a gas pressure of 35 p. s. i. within the protector and bending the cable to make a sharp right angle bend immediately as it passed out of the end of the protector, in order to reveal any tendency of the protector seal to leak under the influence of severe bending stresses within the cable. No leakage was observed under these conditions, and this performance was far superior to that obtainable with conventional constructions.

Having thus described my invention, what I claim and desire to protect by Letters Patent is:

A cable joint protector comprising a tubular enclosing sleeve adapted to be disposed over a cable joint with the cable extending freely out of each end of the sleeve, said sleeve having at each end an identical sealing arrangement comprising, in each instance, an external thread and an internal smooth taper, a correspondingly tapered first resilient plug disposed in said taper, said plug having a hole therethrough of such size as to engage snugly the said cable, a first washer of relatively low frictional resistance disposed against the outer end surface of said plug, a second similar washer disposed against said first washer, said first and second washers being in direct face-to-face contact with each other, said washers having central openings therethrough large enough for the said cable to pass through freely, a second resilient plug disposed against said washers and having a hole therethrough of such size as to engage snugly the said cable, the outer end of said second plug being tapered, an end cap disposed over the end of the said sleeve and having a hole therethrough through which the said cable passes freely, said end cap having an internal thread corresponding to the said thread on the end of the said plastic sleeve, and said end cap having toward its outer end an internal taper corresponding to the taper on said second plug, whereby, when said end cap is screwed onto the sleeve, said plugs are compressed aaginst the said tapered portions of the cap and sleeve with a tight sealing action, such sealing action being enhanced by the presence of the said contacting anti-friction washers, which permit relative rotation of the said resilient plugs as the end cap is tightened.

References Cited in the file of this patent

UNITED STATES PATENTS

| Number | Name | Date |
| --- | --- | --- |
| 402,007 | Dewees | Apr. 23, 1889 |
| 1,042,587 | Moore | Oct. 29, 1912 |
| 1,718,817 | Greene | June 25, 1929 |
| 2,352,159 | Brodie | June 27, 1944 |
| 2,448,888 | Hynes | Sept. 7, 1948 |

FOREIGN PATENTS

| Number | Country | Date |
| --- | --- | --- |
| 317,370 | Italy | May 4, 1934 |